Dec. 9, 1924.                                                    1,518,419
H. H. STYLL
READER
Filed April 10, 1922
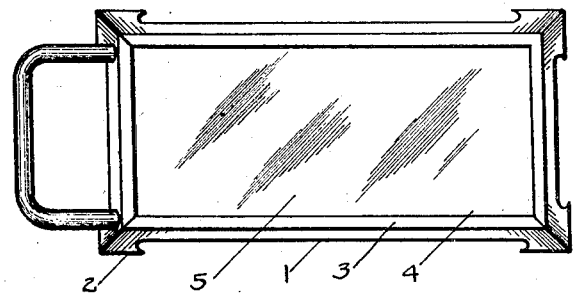
FIG. I
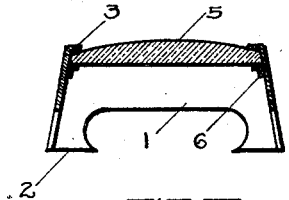
FIG. II
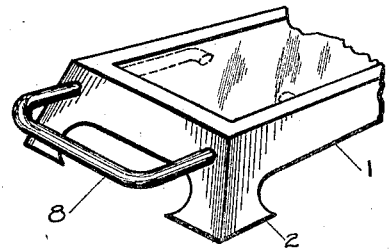
FIG. III
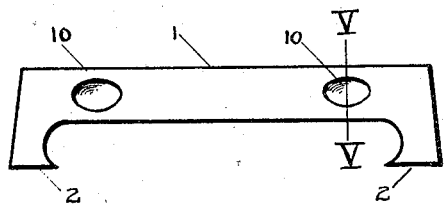
FIG. IV
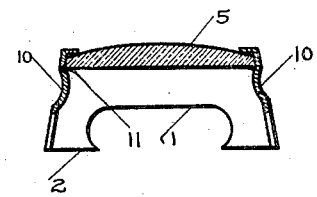
FIG. V
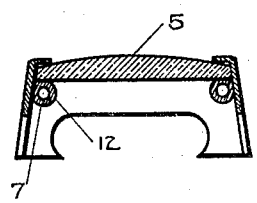
FIG. VI
INVENTOR
HARRY H. STYLL.
BY
H. H. Styll  A. H. Parsons
ATTORNEYS Patented Dec. 9, 1924.

1,518,419

UNITED STATES PATENT OFFICE.

HARRY H. STYLL, OF SOUTHBRIDGE, MASSACHUSETTS.

READER.

Application filed April 10, 1922. Serial No. 551,147.

*To all whom it may concern:*

Be it known that I, HARRY H. STYLL, a citizen of the United States, residing at Southbridge, in the county of Worcester and State of Massachusetts, have invented certain new and useful Improvements in Readers, of which the following is a specification.

This invention relates to new and useful improvements in magnifiers and more particularly to a magnifier especially adapted for use as a reading glass. The main object of the present invention is the provision of a magnifier or reading glass which is formed entirely of non-metallic material whereby to reduce the weight of the magnifier and, at the same time, provide a magnifier having sufficient wearing qualities and durability to withstand the ordinary usage of a magnifier of this type.

A further object of this invention is the provision of a reading glass provided with a supporting frame and including in its construction a handle which when not in use can be moved inwardly beneath the lens so as to facilitate in the packing and shipping of the device or can be readily extended for use in supporting the reading glass in an operative position.

A still further object of the invention is the provision of a magnifier or reading glass, the supporting standard of which is formed of transparent non-metallic material provided with means whereby to support a lens in position and retain the lens against movement regardless of the position of the supporting frame.

A still further object of the invention is the provision of a reading glass including a non-metallic supporting frame having means for supporting a lens within the frame in its proper operative position and preventing any movement on the part of the lens regardless of the position of the frames, said means including supporting elements for a movable handle member which when not in use is disposed beneath the lens within the frame and can be readily moved to an operative position for use in supporting the reading glass in an operative position or moving the same to various positions with respect to the article to be magnified.

A further object of the invention is the provision of a reading glass including a support to properly retain the lens at the necessary focal distance and, at the same time, serve to hold the work in a satisfactory reading position and produce the desired magnification without noticeable distortion or aberration and from this it will be apparent that the device will prove extremely efficient for the desired purpose.

A still further object of the invention is the provision of a reading glass in which the lens is formed with a weak spherical on one side giving an even magnification and a cylindrical power on the opposite side with its axis extending longitudinally of the magnifier to provide an additional magnification as in the height of the printing to greatly increase its visibility.

With the above and other objects in view the invention consists in the novel features of construction, the combination and arrangement of parts hereinafter more fully said forth, pointed out in the claims and shown in the accompanying drawings, in which—

Figure I is a top plan view of a reading glass constructed in accordance with my invention illustrating the use of same.

Figure II is a transverse sectional view.

Figure III is a prospective power of one end of the reader.

Figure IV is a side elevation of a modified form of the reader.

Figure V is a transverse section on the lines V—V of Figure IV, and

Figure VI is a transverse section illustrating a modified form of lens support for our improved reader.

Referring more particularly to the drawings in which I have illustrated my improved reading glass the numeral 1 indicates an elongated body having supporting legs 2 arranged at each corner thereof, the upper edge of the body being turned inwardly to form the flange 3 which extends entirely around the central opening 4. This body 1, together with the legs 2 is stamped from a single sheet of transparent non-metallic material, such as a cellulose composition.

The lens which is generally indicated by the numeral 5 is formed with a weak spherical on one side which gives an even magnification while the other side of the lens is provided with a cylindrical power having its axis extended longitudinally of the magnifier to produce an additional magnification as in the height of the printing which will greatly increase the visibility of the matter beneath the lens. The lens is placed in position within the body by inverting the position of the body 1 and dropping the lens onto the inwardly turned flange 3. In order to retain the lens in position suitable stop members 6 are cemented onto the inner face of the walls of the body 1 and arranged directly beneath the lens as illustrated in Figure II. From this it will be apparent that after the lens has been positioned on the flange 3 and the stop member 6 cemented or otherwise secured to the inner wall of the body, the lens will be held against movement regardless of the position of the frame.

In order that the reader can be conveniently handled for use in magnifying, one end of the body which is provided with spaced openings 7 and fitted in to these openings are the side portions of a U shaped handle 8. This handle member, as stated above, has its side portions extended thru the opening 7 and when not in use the side portions will be extended beneath the lens 5 upon the interior of the frame or body one.

Various ways and means may be utilized for connecting or arranging the inner ends of the side portions of the handle 8, but in Figure III I have illustrated the inner ends of the side portions as extended at right angles to the side portions and disposed at longitudinal alignment with each other so that when the handle member is extended to its operative position the aligned portions 9 will provide a stop to limit the outward sliding movement of the handle. In Figure IV I have illustrated a modified form of reader wherein suitable depressions 10 are formed within the side walls of the body 1, the depressions extending inwardly to the interior of the body and are so positioned as to support the lens 5 when the lens is in its operative position within the body and resting against the inturned flange 3. It will be apparent that as the body of our improved reader is formed of non-metallic material, including a certain amount of flexibility, these depressions can be formed within the body during its stripping process so that when it is desired to fit the lens 5 in position the edges of the lens can be pressed beyond the inner curved surfaces of these depressions and the raised portions 11 formed upon the inner walls of the body. Due to the depressions 10 are provided stops for engagement by the lens 5 to retain the lens in its proper position disposed between the inturned flange 3 and the raised portions 11. It will be apparent from this construction that the lens 5 can be very readily placed in position or removed if found necessary.

Attention is called to the fact that the depressions 10 are so positioned within the sides of the body 1 that they can be readily used as finger grips to facilitate handling of the reader as well as utilizing the raised portions 11 for the lens support. After the depressions 10 are used for finger grips the handle member 8 which is shown as used in connection with the main form of the invention can be eliminated.

In Figure VI I have illustrated a modified form of the invention which relates particularly to the means for retaining the lens in position within the frame but also to means for supporting and guiding the side portions of the handle member 8. I have illustrated in this modification the use of side sleeves 12 which are cemented or otherwise secured to the inner faces of the side walls of body 1 adjacent the lens 5 so that these sleeves 12 not only provide retaining means for the lens but can be used as guides to receive the side portions of the handle member 8. The sleeves 12 are to be disposed at each end of the frame and positioned against the inner face of the lens as illustrated for the purpose set forth above.

While I have shown and described only one handle member 8 attached to the reading glass it will be apparent that a handle member of this type can be attached to each end of the frame if found necessary or desirable.

What I claim is—

1. A reader including a non-metallic transparent frame, an elongated magnifier carried by said frame, a movable handle member carried by said frame having its side portions positioned beneath the lens when in an operative position, said handle member being extended beyond the end of the frame to an operative position and means for limiting the outward movement of said handle member.

2. A reader including a non-metallic frame member, a magnifier supported within said frame, guide sleeves positioned upon one side of the lens upon the interior of the frame, a handle member having its side portions movable thru one end of the body and mounted within said sleeves, the inner ends and side portions of the handle member being in an operative position beneath the lens and the outer end of said handle member being moved away from the end of the frame to an operative position and means for limiting the outer movement of said handle member.

3. A reader comprising a frame member stamped from a single sheet of cellulose composition having an inwardly extending flange formed along its upper edges of the magnifier positioned below the flange, and retaining means positioned below the magnifier to maintain the same in position.

4. A reader comprising an elongated frame member stamped from a single sheet of cellulose composition and of a height to support the reader in an operative position and an elongated magnifier positioned with the frame.

5. A reader comprising a frame member, a handle slidably associated within the frame and a magnifier positioned within the frame.

6. A reader comprising an elongated frame member stamped from a single sheet of cellulose composition and having spaced apertures formed in one end thereof, a handle slidable through the apertures, means to restrict the movement of said handle, an elongated magnifier, and means to support said magnifier in an operative position within the frame.

7. A reader comprising a frame member stamped from a single sheet of cellulose composition and having a plurality of openings formed therein to admit of the passage of light therethrough, and a magnifier positioned within the frame member and arranged above the openings.

HARRY H. STYLL.